United States Patent
Patel et al.

(10) Patent No.: US 11,851,604 B2
(45) Date of Patent: Dec. 26, 2023

(54) CATIONIC NITROGEN-CONTAINING HETEROCYCLES AND THEIR APPLICATION IN WELLBORE STABILITY

(71) Applicant: Saudi Arabian Oil Company, Dhahran (SA)

(72) Inventors: Hasmukh A. Patel, Katy, TX (US); Carl Thaemlitz, Cypress, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/873,392

(22) Filed: Jul. 26, 2022

(65) Prior Publication Data

US 2022/0380654 A1 Dec. 1, 2022

Related U.S. Application Data

(62) Division of application No. 17/004,563, filed on Aug. 27, 2020, now Pat. No. 11,427,743.

(51) Int. Cl.
*C09K 8/12* (2006.01)
*C08G 73/06* (2006.01)
*C09K 8/528* (2006.01)

(52) U.S. Cl.
CPC ............ *C09K 8/12* (2013.01); *C08G 73/0694* (2013.01); *C09K 8/528* (2013.01)

(58) Field of Classification Search
CPC ...... C09K 8/12; C09K 8/528; C09K 2208/12; C09K 8/035; C08G 73/0694
See application file for complete search history.

(56) References Cited

U.S. PATENT DOCUMENTS

| | | | |
|---|---|---|---|
| 4,447,342 | A | 5/1984 | Borchardt et al. |
| 7,915,202 | B2 | 3/2011 | Smith et al. |
| 2016/0137905 | A1 | 5/2016 | Patil et al. |
| 2018/0022985 | A1 | 1/2018 | Siemer et al. |

FOREIGN PATENT DOCUMENTS

| | | | |
|---|---|---|---|
| DE | 1150943 B | | 7/1963 |
| KR | 20160097018 A | * | 8/2016 |
| WO | 2016096502 A1 | | 6/2016 |
| WO | 2016096970 A1 | | 6/2016 |

OTHER PUBLICATIONS

Byun (Byun, J. et al., Reversible water capture by a charged metal-free porous polymer, Polymer, 2017, 126, 308-313).*
An et al., "A strong inhibition of polyethyleneimine as shale inhibitor in drilling fluid", Journal of Petroleum Science and Engineering, vol. 161, pp. 1-8, 2018.
Huang et al., "Nanoscale Laponite as a Potential Shale Inhibitor in Water-Based Drilling Fluid for Stabilization of Wellbore Stability and Mechanism Study", ASC Applied Materials & Interfaces, vol. 10, pp. 33252-33259, 2018.
Patel et al., "Functionalized Layered Nanomaterials: A Next-Generation Shale Inhibitor", International Petroleum Technology Conference, 9 pgs. Jan. 13-15, 2020.
Qui et al., "Effect of Amphiphilic Polymer/Nano-Silica Composite on Shale Stability for Water-Based Muds", Applied Science, vol. 8, 15 pgs., Oct. 2, 2018.
Rana et al., "Advanced developments in shale inhibitors for oil production with low environmental footprints—A review", Fuel, vol. 247, pp. 236-249, 2019.
Xie et al., "Investigating the Role of Alkyl Chain Length of the Inhibitors on its Intercalation Inhibiting Mechanism in Sodium Montmorillonite", Energy & Fuels, vol. 33, pp. 5182-5190, 2019.
International Search Report and Written Opinion dated May 28, 2021 pertaining to International application No. PCT/US2021/016030 filed Feb. 1, 2021, 15 pages.
Byun, J. et al. "Reversible water capture by a charged metal-free porous polymer", Polymer, vol. 126, Jun. 2, 2017, pp. 308-313.

* cited by examiner

*Primary Examiner* — Kumar R Bhushan
(74) *Attorney, Agent, or Firm* — DINSMORE & SHOHL LLP

(57) ABSTRACT

A method of inhibiting shale formation during water-based drilling of subterranean formations include s introducing a shale inhibitor to the subterranean formation during the water-based drilling, the shale inhibitor comprising a cationic polymer comprising repeating units of [A-B]. A is a substituted benzene or a substituted triazine of formula (2). B is a N-containing heterocycle. The cationic polymer and a method of making the cationic polymer are also described.

13 Claims, No Drawings

CATIONIC NITROGEN-CONTAINING HETEROCYCLES AND THEIR APPLICATION IN WELLBORE STABILITY

CROSS-REFERENCE TO RELATED APPLICATIONS

The present application is a divisional application of U.S. patent application Ser. No. 17/004,563, filed Aug. 27, 2020, the entire contents of which are incorporated by reference in the present disclosure.

FIELD

Embodiments of the present disclosure generally relate to wellbore stability, and pertain particularly to cationic polymers and methods of using the cationic polymers for inhibiting shale formation during water-based drilling of subterranean formations.

TECHNICAL BACKGROUND

Drilling fluids may be added to subterranean formations for many purposes, including suspending and transporting drill cuttings, cooling and lubricating the drilling bits, maintaining borehole stability, and reducing formation damage. In general, there are water-based drilling fluids and oil-based drilling fluids. Oil-based drilling fluids tend to be stable under the elevated temperatures and pressures common in at least the deeper portions of the borehole but also suffer from handling and environmental issues. Water-based drilling fluids, although lower in cost and environmental impact, may severely damage the wellbore. Severe hydration and swelling of clays in the bore can narrow the bore diameter, alter the stress distribution around the borehole, reduce the shale mechanical strength, and cause borehole instability. Dispersion of clay and shale may accelerate wellbore sloughing and deteriorate the rheological properties of drilling fluids. Eventually, the drilling process is delayed, and oil-well construction costs increase significantly due to severe shale hydration, swelling, and dispersion. Therefore, many drilling fluids include shale inhibiting agents.

The most widely employed shale inhibiting agent is potassium chloride. Additives, such as polyacrylamide, polyglycol, and silicates, may be combined with the potassium chloride to obtain better characteristics. Massive quantities of potassium chloride are required for achieving the desired shale inhibition, resulting in contamination and environmental issues due to the introduction of a large concentration of chloride ions. Other shale inhibiting materials include amine- and imine-based low or high molecular weight compounds, acrylamides, glycols, glycerols, biomolecules, formate salts, silicates, and the like. Due to variable characteristics, such as the irregular shape of clay minerals, a wide variation in the particle size, various types of charges, the ion exchange capacity, and the flexibility of the layers, no shale inhibitor compounds have been entirely successful in stabilizing the borehole.

SUMMARY

Therefore, there is a continual need for a water-based shale inhibitor that provides improved borehole stability. Embodiments of the present disclosure are directed to cationic polymers, and methods of using for inhibiting shale formation during water-based drilling of subterranean formations while achieving improved borehole stability.

According to an embodiment, a method of inhibiting shale formation during water-based drilling of subterranean formations includes introducing a shale inhibitor to the subterranean formation during the water-based drilling, the shale inhibitor comprising a cationic polymer comprising repeating units of [A-B]. A is a substituted benzene or a substituted triazine of formula (2):

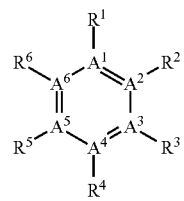

(2)

$A^1$, $A^2$, $A^3$, $A^4$, $A^5$, and $A^6$ are independently C or N. $R^1$, $R^2$, $R^3$, $R^4$, $R^5$, and $R^6$ are independently a bond to B of formula (1), a hydrogen radical, X, an unsubstituted alkyl, or an alkyl bearing at least one substituent X. X is independently Cl, Br, or I. B is a N-containing heterocycle.

According to an embodiment, a method of making the cationic polymer, as defined above, includes introducing a substituted benzene or a substituted triazine of formula (2) to a N-containing heterocycle to obtain a reaction mixture having a molar ratio of the substituted benzene or the substituted triazine of formula (2) to the N-containing heterocycle, and maintaining the reaction mixture in a solvent at a temperature from 0° C. to 50° C. for from 2 hours to 24 hours.

According to an embodiment, a cationic polymer comprises repeating units of [A-B], as defined above.

Additional features and advantages of the embodiments described herein will be set forth in the detailed description which follows, and in part will be readily apparent to those skilled in the art from that description or recognized by practicing the embodiments described, including the detailed description and the claims which are provided infra.

DETAILED DESCRIPTION

As used herein, the term "hydrocarbon" refers to a chemical compound comprising carbon and hydrogen atoms. An expression such as "$C_x$-$C_y$ hydrocarbon" refers to a hydrocarbon having from x to y carbon atoms. For instance, a $C_1$-$C_5$ hydrocarbon includes methane, ethane, propane, butane, isobutane, pentane, isopentane, and neopentane. Other atoms may also be present, such as oxygen, sulfur, and nitrogen, for example.

As used herein, the term "subterranean formation" refers to a deposit reservoir that contains a subsurface pool of hydrocarbons contained in porous or fractured rock formations.

As used herein, the term "alkyl" refers to saturated, straight-, or branched-chain hydrocarbon radicals derived from an aliphatic moiety containing between one and twenty carbon atoms by removal of a single hydrogen atom. Unless otherwise specified, alkyl groups contain 1-12 carbon atoms. In certain embodiments, alkyl groups contain 1-8 carbon atoms. In embodiments, alkyl groups contain from 1 to 6 carbon atoms. In embodiments, alkyl groups contain from 1 to 5 carbon atoms. In embodiments, alkyl groups contain from 1 to 4 carbon atoms. In other embodiments, alkyl groups contain from 1 to 3 carbon atoms. In embodiments, alkyl groups contain from 1 to 2 carbon atoms. Exemplary alkyl radicals include, but are not limited to, methyl, ethyl, n-propyl, isopropyl, n-butyl, isobutyl, sec-butyl, sec-pentyl, isopentyl, tert-butyl, n-pentyl, neopentyl, n-hexyl, sec-hexyl, n-heptyl, n-octyl, n-decyl, n-undecyl, dodecyl, and the like.

As used herein, the term "heterocycle" or "heterocyclic compound" refers to a cyclic compound that has atoms of at least two different elements, such as carbon and nitrogen, as members of the cyclic system.

As used herein, the term "weight-average molecular weight" refers to a property of a sample of polymers that is calculated based on the size of the individual polymer molecules in a sample, as opposed to "number-average molecular weight," which is calculated based on the number of repeating units in the polymer. Weight-average molecular weight may be given by equation (1):

$$M_w = \frac{\sum N_x M_x^2}{\sum N_x M_x} \quad (1)$$

where $M_w$ is the weight-average molecular weight, $N_x$ is the total number of molecules of length x, and $M_x$ is the molecular weight of a molecule corresponding to a degree of polymerization x.

As used herein, the term "thermal stability" of a sample of polymers refers to the sample's resistance to degradation in the presence of an elevated temperature over a period of time.

Embodiments of the present disclosure are directed toward a method of inhibiting shale formation during water-based drilling of subterranean formations. The method includes introducing a shale inhibitor to the subterranean formation during the water-based drilling. The shale inhibitor includes a cationic polymer comprising repeating units of formula (1):

[A-B]  (1)

where A is a substituted benzene or a substituted triazine of formula (2).

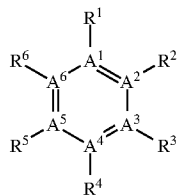

(2)

$A^1$, $A^2$, $A^3$, $A^4$, $A^5$, and $A^6$ are independently C or N. $R^1$, $R^2$, $R^3$, $R^4$, $R^5$, and $R^6$ are independently a bond to B of formula (1), a hydrogen radical, X, an unsubstituted alkyl, or an alkyl bearing at least one substituent X. X is independently Cl, Br, or I. B of formula (1) is a N-containing heterocycle. Embodiments described herein are also directed to the cationic polymer comprising repeating units of formula (1).

In embodiments, A of formula (1) is a substituted benzene or a substituted triazine of formula (2). For example, A may be selected from a triazine compound of formula (3), a benzene compound of formula (4), a benzene compound of formula (5), and a combination of two or more of these.

In embodiments, at least one of $R^1$, $R^3$, and $R^5$ is X and the others of $R^1$, $R^3$, and $R^5$ are a bond to B. In embodiments, $R^1$ and $R^4$ are both bonds to B.

B of formula (1) is a N-containing heterocycle. In embodiments, B is a substituted or unsubstituted bipyridine, a bridged bicyclic compound of formula (6), a bridged tricyclic compound of formula (7), a pyrazine compound of formula (8), or a combination of two or more of these.

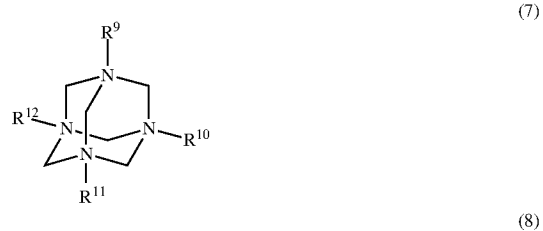

$R^7$, $R^8$, $R^9$, $R^{10}$, $R^{11}$, $R^{12}$, $R^{13}$, and $R^{14}$ may be independently an electron pair or a bond to A, wherein if the $R^7$, $R^8$, $R^9$, $R^{10}$, $R^{11}$, $R^{12}$, $R^{13}$, or $R^{14}$ is a bond to A, the N bears a +1 formal charge. $R^{15}$, $R^{16}$, $R^{17}$, and $R^{18}$ are independently a hydrogen radical, hydroxyl, straight or branched alkyl (such as methyl, ethyl, and propyl), thiol, azide, nitrile, or aryl.

In embodiments in which B is a bipyridine, the bipyridine may be one or more of the six regioisomers of bipyridine, formulae (9)-(14). The nitrogen radicals of formulae (9)-(14) are bonded to A and bear a +1 formal charge. Each carbon radical of formulae (9)-(14) may independently be bonded to a hydrogen radical (and thus be unsubstituted) or may be substituted by being bonded to hydroxyl, straight or branched alkyl (such as methyl, ethyl, and propyl), thiol, azide, nitrile, or aryl.

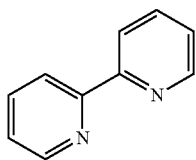

(9)

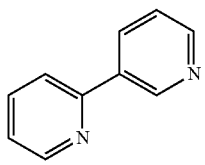

(10)

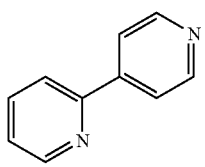

(11)

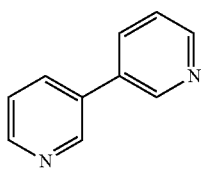

(12)

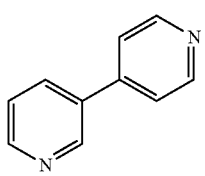

(13)

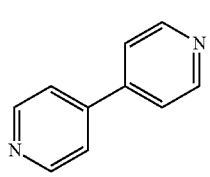

(14)

In embodiments, the cationic polymer of formula (1) may include repeating units of formula (15), repeating units of formula (16), or a combination of repeating units of formula (15) and formula (16). Of course, the repeating units may be composed of any of the compounds of A described herein and any of the compounds of B described herein.

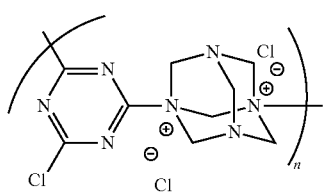

(15)

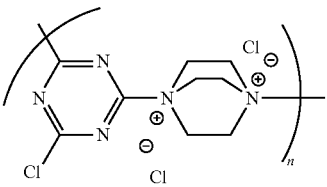

(16)

In embodiments, the cationic polymer of formula (1) may have a weight-average molecular weight $M_w$ from 10 kilodaltons (kDa) to 1000 kDa, from 20 kDa to 750 kDa, from 25 kDa to 500 kDa, from 75 kDa to 500 kDa, or even from 25 kDa to 100 kDa. It should be understood that the weight-average molecular weight $M_w$ may be from any lower bound of such weight-average molecular weight described herein to any upper bound of such weight-average molecular weight described herein.

In embodiments, the cationic polymer of formula (1) may have a thermal stability in inert or oxidative atmosphere from 150° C. to 250° C., from 175° C. to 225° C., or even from 190° C. to 200° C. In general, a higher thermal stability of the cationic polymer, the less likely the polymer is to degrade at the conditions in a typical wellbore.

In embodiments, the cationic polymer of formula (1) may be associated with one or more counter anions. Exemplary counter anions include, but are not limited to, chloride, bromide, iodide, hydroxide, and a combination of two or more of these. Formulae (15) and (16) are shown bearing chloride counter anions, but it is envisioned that any appropriate counter anion may replace one or more, including all, of the chloride anions shown.

In embodiments, the cationic polymer may be made by introducing a substituted benzene or a substituted triazine of formula (2) to a N-containing heterocycle to obtain a reaction mixture and maintaining the reaction mixture in a solvent at a temperature from 0° C. to 50° C., from 2° C. to 40° C., or even from 25° C. to 35° C., for from 2 hours to 24 hours, from 4 hours to 10 hours, or even from 5 hours to 7 hours.

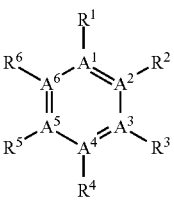

(2)

$A^1, A^2, A^3, A^4, A^5$, and $A^6$ are independently C or N. $R^1, R^2, R^3, R^4, R^5$, and $R^6$ are independently a bond to the N-containing heterocycle, X, an unsubstituted alkyl, or an alkyl bearing at least one substituent X. X is independently Cl, Br, or I. An exemplary substituted benzene or substituted triazine of formula (2) includes, but is not limited to, cyanuric chloride, cyanuric bromide, cyanuric iodide, 1,3,5-trichlorobenzene, 1,3,5-tribromobenzene, 1,3,5-triiodobenzene, 1,3-dibromo-5-chlorobenzene, 1,3-dibromo-5-iodobenzene, 1,3-dichloro-5-iodobenzene, 1-chloro-3,5-diiodobenzene, 1-bromo-3,5-diiodobenzene, 1-bromo-3,5-dichlorobenzene, 1,3,5-tri(chloromethyl)benzene, 1,3,5-tri(bromomethyl)benzene, 1,3,5-tri(iodomethyl)benzene, 1,3-dichloromethyl-5-iodomethylbenzene, 1,3-dibromomethyl-5-chloromethylbenzene, 1,3-dibromomethyl-5-iodomethylbenzene, 1-bromomethyl-3,5-dichloromethylbenzene, 1-bromomethyl-3,5-diiodomethylbenzene, 1-chloromethyl-3,5-diiodomethylbenzene, 1,4-dichlorobenzene, 1,4-dibromobenzene, 1,4-diiodobenzene, 1-bromo-4-iodobenzene, 1-bromo-4-chlorobenzene, 1-chloro-4-iodobenzene, 1,4-di(chloromethyl)benzene, 1,4-di(bromomethyl)benzene, 1,4-di(iodomethyl)benzene, 1-bromomethyl-4-chloromethylbenzene, 1-bromomethyl-4-iodomethylbenzene, and 1-chloromethyl-4-bromomethylbenzene.

In embodiments, the ratio of the substituted benzene or the substituted triazine of formula (2) to the N-containing heterocycle may be from 1:05 to 1:1.5, from 1:0.2 to 1:1.2, from 1:0.5 to 1:1.1, or even from 1:0.75 to 1:1.

In embodiments, the N-containing heterocycle may be a substituted or unsubstituted bipyridine, a compound of formula (6), a compound of formula (7), a compound of formula (8), or a combination of two or more of these.

(6)

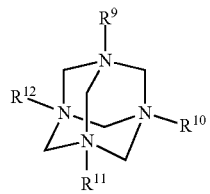

(7)

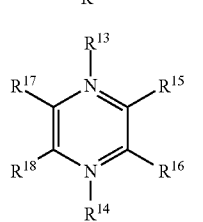

(8)

$R^7$, $R^8$, $R^9$, $R^{10}$, $R^{11}$, $R^{12}$, $R^{13}$ and $R^{14}$ are independently an electron pair or a bond to the substituted benzene or a substituted triazine of formula (2), wherein if the $R^7$, $R^8$, $R^9$, $R^{10}$, $R^{11}$, $R^{12}$, $R^{13}$, or $R^{14}$ is a bond to the substituted benzene or a substituted triazine of formula (2), the N bears a +1 formal charge. $R^{15}$, $R^{16}$, $R^{17}$, and $R^{18}$ are independently a hydrogen radical, hydroxyl, straight or branched alkyl (such as methyl, ethyl, and propyl), thiol, azide, nitrile, or aryl. An exemplary N-containing heterocycle includes, but is not limited to, hexamethylenetetramine, and 1,4-diazabicyclo[2.2.2]octane, 6-methyl-2-pyrazinethiol, 5-methyl-2-pyrazinecarbonitrile, 2-methyl-5-phenylpyrazine, 2-azido-5-methylpyrazine, and pyrazine.

In embodiments in which the N-containing heterocycle is a bipyridine, the bipyridine may be one or more of the six regioisomers of bipyridine, formulae (9)-(14). The nitrogen radicals of formulae (9)-(14) are bonded to A and bear a +1 formal charge or, at the termini of the polymer chains, bear an electron pair. Each carbon radical of formulae (9)-(14) may independently be bonded to a hydrogen radical (and thus be unsubstituted) or may be substituted by being bonded to hydroxyl, straight or branched alkyl (such as methyl, ethyl, and propyl), thiol, azide, nitrile, or aryl.

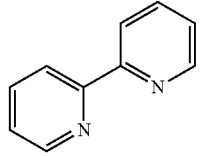

(9)

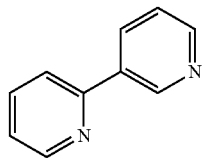

(10)

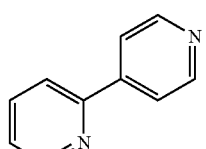

(11)

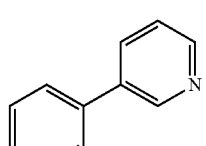

(12)

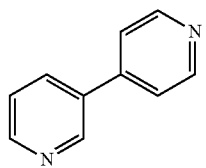

(13)

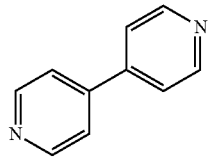

(14)

In embodiments, the cationic polymer may include repeating units of formula (15), repeating units of formula (16), or a combination of repeating units of formula (15) and formula (16). Of course, the repeating units may be composed of any of the substituted benzenes or substituted triazines of formula (2) described herein and any N-containing heterocycle described herein. In embodiments, the cationic polymer may be associated with one or more counter anions. Exemplary counter anions include, but are not limited to, chloride, bromide, iodide, hydroxide, and a combination of two or more of these. Formulae (15) and (16) are shown bearing chloride counter anions, but it is envisioned that any appropriate counter anion may replace one or more, including all, of the chloride anions shown.

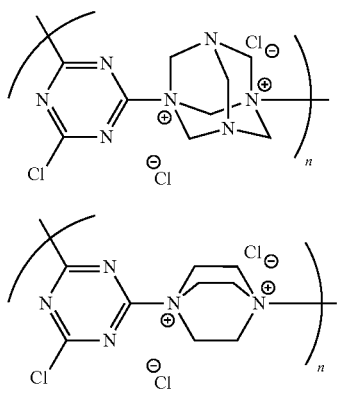

(15)

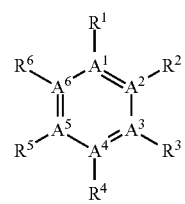

(16)

In embodiments, the solvent may be one or more of acetonitrile, diethyl ether, tetrahydrofuran, dioxane, an alcoholic solvent, a chlorinated solvent, or an aromatic hydrocarbon solvent. Exemplary alcoholic solvents include, but are not limited to, methanol, ethanol, isopropanol, t-butanol, pentanol, and mixtures of two or more thereof. Exemplary chlorinated solvents include, but are not limited to, methyl chloride, dichloromethane, chloroform, carbon tetrachloride, and mixtures of two or more thereof. Exemplary aromatic hydrocarbon solvents include, but are not limited to, benzene, toluene, ortho-xylene, meta-xylene, para-xylene, and mixtures of two or more thereof. In embodiments, the solvent comprises dichloromethane. In embodiments, the solvent comprises tetrahydrofuran. In embodiments, both the substituted benzenes or substituted triazines of formula (2) and the N-containing heterocycle may be mixed together, and the resulting mixture may then be dissolved in the solvent. In other embodiments, the substituted benzenes or substituted triazines of formula (2) may be dissolved in a solvent, the N-containing heterocycle may be dissolved in the same or a different solvent, and then the two resulting solutions may be combined.

In embodiments, the weight of the substituted benzene or the substituted triazine of formula (2) and the weight of the N-containing heterocycle may be added together to provide a total monomer weight. The ratio of the total monomer weight to the volume of the solvent may be from 2 grams of total monomer per 100 milliliters of solvent (2 g/100 ml) to 50 g/100 ml, from 2 g/100 ml to 45 g/100 ml, from 2 g/100 ml to 40 g/100 ml, from 2 g/100 ml to 35 g/100 ml, from 2 g/100 ml to 30 g/100 ml, from 2 g/100 ml to 25 g/100 ml, from 2 g/100 ml to 20 g/100 ml, from 2 g/100 ml to 15 g/100 ml, from 2 g/100 ml to 10 g/100 ml, from 2 g/100 ml to 5 g/100 ml, from 5 g/100 ml to 50 g/100 ml, from 5 g/100 ml to 25 g/100 ml, from 10 g/100 ml to 50 g/100 ml, from 10 g/100 ml to 15 g/100 ml, from 15 g/100 ml to 50 g/100 ml, from 20 g/100 ml to 50 g/100 ml, from 25 g/100 ml to 50 g/100 ml, from 30 g/100 ml to 50 g/100 ml, from 35 g/100 ml to 50 g/100 ml, from 40 g/100 ml to 50 g/100 ml, or even from 45 g/100 ml to 50 g/100 ml. It should be understood that the ratio of the total monomer weight to the volume of the solvent may be in a range from any lower limit of such a ratio described herein to any upper limit of such a ratio described herein.

In embodiments, the temperature may be maintained for a time and then increased to an elevated temperature for an additional amount of time. For instance, the reaction mixture may be maintained at a temperature from 0° C. to 12° C. for from 1 hour to 2 hours. Then, the temperature may be increased to a range from 12° C. to 50° C.

According to an aspect, either alone or in combination with any other aspect, a method of inhibiting shale formation during water-based drilling of subterranean formations includes introducing a shale inhibitor to the subterranean formation during the water-based drilling, the shale inhibitor comprising a cationic polymer comprising repeating units of [A-B]. A is a substituted benzene or a substituted triazine of formula (2):

(2)

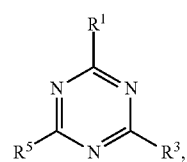

$A^1$, $A^2$, $A^3$, $A^4$, $A^5$, and $A^6$ are independently C or N. $R^1$, $R^2$, $R^3$, $R^4$, $R^5$, and $R^6$ are independently a bond to B of formula (1), a hydrogen radical, X, an unsubstituted alkyl, or an alkyl bearing at least one substituent X. X is independently Cl, Br, or I. B is a N-containing heterocycle.

According to a second aspect, either alone or in combination with any other aspect, A is selected from the group consisting of:

(3)

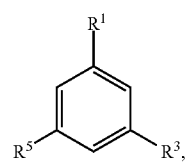

(4)

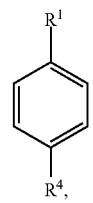

(5)

and a combination of two or more thereof.

According to a third aspect, either alone or in combination with any other aspect, at least one of $R^1$, $R^3$, and $R^5$ is X and the others of $R^1$, $R^3$, and $R^5$ are a bond to B.

According to a fourth aspect, either alone or in combination with any other aspect, $R^1$ and $R^4$ are both bonds to B.

According to a fifth aspect, either alone or in combination with any other aspect, B is selected from the group consisting of:

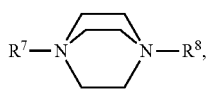

(6)

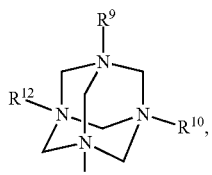

(7)

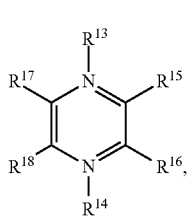

(8)

a substituted or unsubstituted bipyridine, and a combination of two or more thereof. $R^7$, $R^8$, $R^9$, $R^{10}$, $R^{11}$, $R^{12}$, $R^{13}$, and $R^{14}$ are independently an electron pair or a bond to A, wherein if the $R^7$, $R^8$, $R^9$, $R^{10}$, $R^{11}$, $R^{12}$, $R^{13}$, or $R^{14}$ is a bond to A, the N bears a+1 formal charge. $R^{15}$, $R^{16}$, $R^{17}$, and $R^{18}$ are independently a hydrogen radical, hydroxyl, straight or branched alkyl, thiol, azide, nitrile, or aryl.

According to a sixth aspect, either alone or in combination with any other aspect, the cationic polymer comprises repeating units of formula (15), repeating units of formula (16), or a combination of repeating units of formula (15) and formula (16):

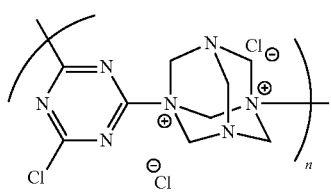

(15)

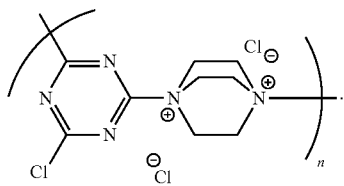

(16)

According to a seventh aspect, either alone or in combination with any other aspect, the cationic polymer has a weight-average molecular weight from 10 kilodaltons (kDa) to 1000 kDa.

According to an eighth aspect, either alone or in combination with any other aspect, the cationic polymer has a weight-average molecular weight from 25 kilodaltons (kDa) to 500 kDa.

According to a ninth aspect, either alone or in combination with any other aspect, the cationic polymer has a weight-average molecular weight from 25 kilodaltons (kDa) to 100 kDa.

According to a tenth aspect, either alone or in combination with any other aspect, a method of making a cationic polymer introducing a substituted benzene or the substituted triazine of formula (2) to a N-containing heterocycle to obtain a reaction mixture having a molar ratio of the substituted benzene or the substituted triazine of formula (2) to the N-containing heterocycle.

According to an eleventh aspect, either alone or in combination with any other aspect, the ratio of the substituted benzene or the substituted triazine of formula (2) to the N-containing heterocycle is from 1:0.2 to 1:1.2.

According to a twelfth aspect, either alone or in combination with any other aspect, the solvent is selected from the group consisting of tetrahydrofuran, dioxane, an alcoholic solvent, a chlorinated solvent, an aromatic hydrocarbon solvent, and a mixture of two or more of these.

According to a thirteenth aspect, either alone or in combination with any other aspect, the solvent is selected from the group consisting of methanol, ethanol, isopropanol, t-butanol, pentanol, and a mixture of two or more of these.

According to a fourteenth aspect, either alone or in combination with any other aspect, the solvent is selected from the group consisting of methyl chloride, dichloromethane, chloroform, carbon tetrachloride, and a mixture of two or more of these.

According to a fifteenth aspect, either alone or in combination with any other aspect, the solvent is selected from the group consisting of benzene, toluene, ortho-xylene, meta-xylene, para-xylene, and a mixture of two or more of these.

According to a sixteenth aspect, either alone or in combination with any other aspect, the substituted benzene or the substituted triazine of formula (2) and the N-containing heterocycle have a total monomer weight, the solvent has a solvent volume, and a ratio of the total monomer weight to the solvent volume is from 2 g/100 ml to 50 g/100 ml.

According to a seventeenth aspect, either alone or in combination with any other aspect, the reaction mixture in a solvent is maintained at a temperature from 0° C. to 12° C. for from 1 hour to 2 hours and then the temperature is increased in a range from 12° C. to 50° C.

According to an eighteenth aspect, either alone or in combination with any other aspect, a cationic polymer includes repeating units of [A-B], where A and B are defined as above.

EXAMPLES

Using embodiments described above, exemplary cationic polymers were synthesized and used to study their effectiveness as shale inhibiting agents. The following examples are merely illustrative and should not be interpreted as limiting the scope of the present disclosure.

Synthesis of Cationic Heterocyclic Polymers:
Synthesis of Polymer POLY A+ (Formula (15)):

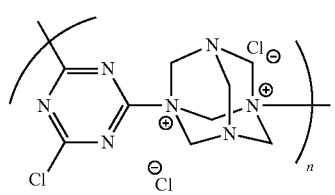

(15)

The molar ratio of a mixture of cyanuric chloride and hexamethylenetetramine was maintained at 1:0.5. In a reaction vessel, hexamethylenetetramine (14 g, 0.1 mol) was dissolved in 500 ml tetrahydrofuran at room temperature, and the solution was cooled to 0° C. Cyanuric chloride (36.8 g, 0.2 mol) was dissolved in 100 ml tetrahydrofuran in a separate vessel. The cyanuric chloride solution was added to the hexamethylenetetramine solution with stirring over 30 minutes. The reaction temperature was maintained at 0° C. to 5° C. for one hour. Subsequently, the reaction mixture was heated to room temperature (25° C. to 30° C.) and stirred at this temperature for five to six hours, resulting in the formation of a precipitate. The precipitate thus formed was filtered and dried at 80° C. to 100° C. for five hours in a vacuum oven.

Synthesis of Polymer POLY B+ (Formula (16)):

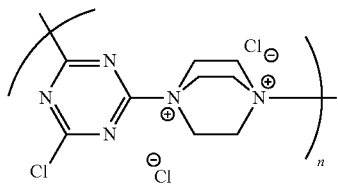

(16)

The molar ratio of cyanuric chloride and 1,4-Diazabicyclo [2.2.2]octane (DABCO) was maintained at 1:1. In a reaction vessel, DABCO (11.2 g, 0.1 mol) was mixed with 200 ml tetrahydrofuran at room temperature, and the solution was cooled to 0° C. Cyanuric chloride (18.4 g, 0.1 mol) was dissolved in 50 ml tetrahydrofuran in a separate vessel. The cyanuric chloride solution was added to the DABCO solution with stirring over 30 min. The reaction temperature was maintained at 0° C. to 5° C. for one hour. Subsequently, the reaction mixture was heated to room temperature (25° C. to 30° C.) and stirred at this temperature for five to six hours, resulting in the formation of a precipitate. The precipitate thus formed was filtered and dried at 80° C. to 100° C. for five hours in a vacuum oven.

Clay Swelling Test:

To observe the effects of POLY A+ and POLY B+ on swelling in clay materials, a clay swelling test was performed using a Fann Capillary Suction Timer (CST). To perform the clay swelling test, formulations were prepared in accordance with Table 1. Each formulation (5 ml) was used for the CST experiments, and the rate of water passing through filter paper via capillary suction using the CST was recorded.

TABLE 1

Clay swelling test formulations and results

| Component | C1 | I1 | I2 | C2 | C3 | C4 |
|---|---|---|---|---|---|---|
| Water (g) | 250 | 250 | 250 | 250 | 250 | 250 |
| Bentonite (g) | 5.1 | 5.1 | 5.1 | 5.1 | 5.1 | 5.1 |
| Silica flour (g) | 24.9 | 24.9 | 24.9 | 24.9 | 24.9 | 24.9 |
| Poly A+ (g) | — | 2.5 | — | — | — | — |
| Poly B+ (g) | — | — | 2.5 | — | — | — |
| Choline chloride (g) | — | — | — | 2.5 | — | — |
| KCl | — | — | — | — | 2.5 | — |
| Hexamethylene diamine (HIPERM ™) (g) | — | — | — | — | — | 2.5 |
| Normalized Time (s) | 400.2 | 12.5 | 12.1 | 13.3 | 13.9 | 13.6 |

As shown above, the formulations including POLY A+ and POLY B+ exhibited faster rates of water passing through filter paper via capillary suction using the CST compared with the comparative formulations C1-C4. As a result, the formulations including POLY A+ and POLY B+ have a superior performance relative to the comparative formulations. Without intending to be bound by any particular theory, it is believed that clay swelling inhibitors or shale inhibitors used in wellbore fluids and other wellbore construction and production applications may be utilized to at least partially prevent clay-based materials from swelling during wellbore construction and production enhancement operations. Further, it is believed that a faster normalized time suggests that the clays are not retaining as much water, thereby minimizing water interaction with the clays. Therefore, the results obtained above suggest that the formulations including POLY A+ and POLY B+ exhibit superior swell retarding effects when compared to the comparative examples.

Shale Dispersion Test:

Pierre II Shale, which has the composition provided in Table 2, was used in the shale dispersion test. Shale cuttings were broken into small pieces with a benchtop jaw crusher or manually, with a hammer, and passed through a #4 mesh screen having openings of 4760 μm (0.187 inches). The shale material that passed through the #4 mesh screen was then passed over a #8 mesh screen having openings of 2380 μm (0.0937 inches). The material that passed through the #8 mesh screen was disposed of, while the material that could not pass through the screen was saved for shale erosion studies.

TABLE 2

Composition of Piere II Shale

| Component | Weight percent (%) |
|---|---|
| Quartz | 36 |
| Potassium feldspar | 4 |
| Plagioclase | 6 |
| Calcite | 1 |
| Dolomite | 5 |
| Pyrite | 2 |
| Chlorite | 3 |
| Kaolinite | 1 |
| Smectite | 24 |
| Illite | 18 |

Shale dispersion tests were performed using two types of base fluids: synthetic Arabian Sea water and de-ionized water. The synthetic Arabian Sea water included: $CaCl_2$) (1.71 g/l), $MgCl_2$ (8.26 g/l), KCl (1.13 g/l), NaCl (41.72 g/l), $NaHCO_3$ (0.21 g/l), and $Na_2SO_4$ (6.12 g/l). Samples were prepared using inhibitors, xanthan gum, and synthetic Arabian Sea water (Table 3) or de-ionized water (Table 4) in amounts provided by Tables 3 and 4. The xanthan gum was used as a viscosifier for better suspending the relatively large Pierre II shales. Other viscosifiers that could be used include, but are not limited to, partially hydrolyzed polyacrylamide, acrylic acid, hydroxylated ethyl cellulose, and a combination of any two or more of these. Pierre II shales prepared as above were then added into the fluids and the dispersion was hot rolled at 26.7° C. (80° F.) for 16 hours. After 16, hours, the dispersion was passed through a #8 mesh screen having openings of 2380 μm (0.0937 inches) to recover shales that were not swelled.

TABLE 3

Formulations and shale stability in synthetic Arabian Sea

| Component | C5 | C6 | C7 | C8 | I3 | I4 |
|---|---|---|---|---|---|---|
| Synthetic Arabian Sea water (g) | 58.3 | 58.3 | 58.3 | 58.3 | 250 | 58.3 |
| Xanthan gum (g) | 0.125 | 0.125 | 0.125 | 0.125 | 0.125 | 0.125 |
| Pierre II shale (g) | 5 | 5 | 5 | 5 | 5 | 5 |
| Choline chloride (g) | — | 0.5 | — | — | — | — |
| KCl (g in 20 g water) | — | — | 0.5 | — | — | — |
| Hexamethylene diamine (HIPERM ™) (g in 20 g water) | — | — | — | 0.5 | — | — |
| Poly A+ (g in 20 g water) | — | — | — | — | 0.5 | |
| Poly B+ (g in 20 g water) | — | — | — | — | — | 0.5 |
| Shale recovered (%) | 63.8 | 81.6 | 75.4 | 72.2 | 84.4 | 87.6 |

TABLE 4

Formulations and shale stability in de-ionized water

| Component | C5 | C6 | C7 | C8 | I3 | I4 |
|---|---|---|---|---|---|---|
| De-ionized water (g) | 58.3 | 58.3 | 58.3 | 58.3 | 250 | 58.3 |
| Xanthan gum (g) | 0.125 | 0.125 | 0.125 | 0.125 | 0.125 | 0.125 |
| Pierre II shale (g) | 5 | 5 | 5 | 5 | 5 | 5 |
| Choline chloride (g) | — | 0.5 | — | — | — | — |
| KCl (g in 20 g water) | — | — | 0.5 | — | — | — |
| Hexamethylene diamine (HIPERM ™) (g in 20 g water) | — | — | — | 0.5 | — | — |
| Poly A+ (g in 20 g water) | — | — | — | — | 0.5 | |
| Poly B+ (g in 20 g water) | — | — | — | — | — | 0.5 |
| Shale recovered (%) | 0.4 | 57.9 | 50.3 | 53.4 | 59.1 | 50.4 |

The amount of recovered shales after shale dispersion tests were calculated from weight loss after the test, and are presented in Table 3 (synthetic Arabian Sea water) and Table 4 (de-ionized water). The shale dispersion studies demonstrate the higher recovery of shales when inhibitors were employed in the shale dispersion test. Furthermore, the shales treated with POLY A+ and POLY B+ gave higher recovery of shales compared to traditional shale inhibitors, choline chloride, KCl, and hexamethylene diamine, as well as compared to the experiment without inhibitor. The shale stability test in de-ionized water showed substantial loss of shales compared to the test in synthetic Arabian Sea water, which corresponds to a higher swelling in fresh water compared to synthetic Arabian Sea water. A higher amount of salts in the sea water could also contribute in the shale inhibition characteristic. The test also suggests that all the shales were swollen when there was no inhibitor added in the de-ionized water experiment; the amount of shale recovered was only 0.4%.

It is noted that recitations in the present disclosure of a component of the present disclosure being "operable" or "sufficient" in a particular way, to embody a particular property, or to function in a particular manner, are structural recitations, as opposed to recitations of intended use. More specifically, the references in the present disclosure to the manner in which a component is "operable" or "sufficient" denotes an existing physical condition of the component and, as such, is to be taken as a definite recitation of the structural characteristics of the component.

Having described the subject matter of the present disclosure in detail and by reference to specific embodiments, it is noted that the various details disclosed in the present disclosure should not be taken to imply that these details relate to elements that are essential components of the various embodiments described in the present disclosure. Further, it will be apparent that modifications and variations are possible without departing from the scope of the present disclosure, including, but not limited to, embodiments defined in the appended claims.

The singular forms "a," "an," and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned.

As used in this disclosure and in the appended claims, the words "comprise," "has," and "include," and all grammatical variations thereof are each intended to have an open, non-limiting meaning that does not exclude additional elements or steps.

As used in this disclosure, terms such as "first" and "second" are arbitrarily assigned and are merely intended to differentiate between two or more instances or components. It is to be understood that the words "first" and "second" serve no other purpose and are not part of the name or description of the component, nor do they necessarily define a relative location, position, or order of the component. Furthermore, it is to be understood that the mere use of the term "first" and "second" does not require that there be any "third" component, although that possibility is contemplated under the scope of the present disclosure.

What is claimed is:

1. A method of making a cationic polymer, comprising introducing a substituted benzene or a substituted triazine of formula (2) to a N-containing heterocycle to obtain a reaction mixture having a molar ratio of the substituted benzene or the substituted triazine of formula (2) to the N-containing heterocycle:

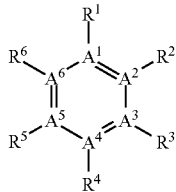 (2)

where
A$^1$, A$^2$, A$^3$, A$^4$, A$^5$, and A$^6$ are independently C or N;
R$^1$, R$^2$, R$^3$, R$^4$, R$^5$, and R$^6$ are independently a bond to the N-containing heterocycle, a hydrogen radical, X, an unsubstituted alkyl, or an alkyl bearing at least one substituent X;
X is independently Cl, Br, or I; and
at least one of R$^1$, R$^3$, and R$^5$ is X and the others of R$^1$, R$^3$, and R$^5$ are a bond to the N-containing heterocycle; and maintaining the reaction mixture in a solvent at a temperature from 0° C. to 50° C. for from 2 hours to 24 hours; and wherein the cationic polymer has a weight-average molecular weight from 10 kilodaltons (kDa) to 1000 kDa;

wherein the cationic polymer comprises repeating units of formula (1):

[A-B]　　(1)

where
A is the substituted benzene or a substituted triazine of formula (2); and
B is the N-containing heterocycle.

2. The method of claim 1, wherein the ratio of the substituted benzene or the substituted triazine of formula (2) to the N-containing heterocycle is from 1:0.2 to 1:1.2.

3. The method of claim 1, wherein the solvent is selected from the group consisting of tetrahydrofuran, dioxane, an alcoholic solvent, a chlorinated solvent, an aromatic hydrocarbon solvent, and a mixture of two or more of these.

4. The method of claim 3, wherein the solvent is selected from the group consisting of methanol, ethanol, isopropanol, t-butanol, pentanol, and a mixture of two or more of these.

5. The method of claim 3, wherein the solvent is selected from the group consisting of methyl chloride, dichloromethane, chloroform, carbon tetrachloride, and a mixture of two or more of these.

6. The method of claim 3, wherein the solvent is selected from the group consisting of benzene, toluene, ortho-xylene, meta-xylene, para-xylene, and a mixture of two or more of these.

7. The method of claim 1, wherein the substituted benzene or the substituted triazine of formula (2) and the N-containing heterocycle have a total monomer weight, the solvent has a solvent volume, and a ratio of the total monomer weight to the solvent volume is from 2 g/100 ml to 50 g/100 ml.

8. The method of claim 1, wherein the reaction mixture in a solvent is maintained at a temperature from 0° C. to 12° C. for from 1 hour to 2 hours and then the temperature is increased in a range from 12° C. to 50° C.

9. A cationic polymer comprising repeating units of formula (1):

[A-B]　　(1)

where
A is a substituted benzene or a substituted triazine of formula (2):

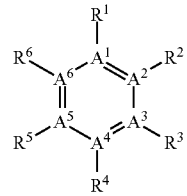 (2)

where
A$^1$, A$^2$, A$^3$, A$^4$, A$^5$, and A$^6$ are independently C or N;
R$^1$, R$^2$, R$^3$, R$^4$, R$^5$, and R$^6$ are independently a bond to B of formula (1), a hydrogen radical, X, an unsubstituted alkyl, or an alkyl bearing at least one substituent X;
X is independently Cl, Br, or I; and
at least one of R$^1$, R$^3$, and R$^5$ is X and the others of R$^1$, R$^3$, and R$^5$ are a bond to B; and
B is a N-containing heterocycle; and
the cationic polymer has a weight-average molecular weight from 10 kilodaltons (kDa) to 1000 kDa.

10. The cationic polymer of claim 9, wherein A is selected from the group consisting of:

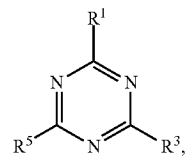 (3)

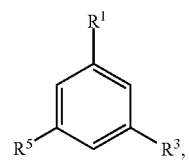 (4)

and a combination thereof.

11. The cationic polymer of claim 9, wherein B is selected from the group consisting of:

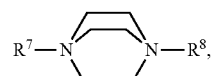 (6)

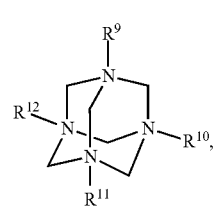 (7)

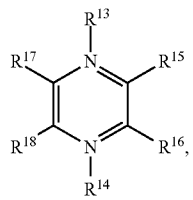

(8)

a substituted or unsubstituted bipyridine, and a combination of two or more thereof, where $R_7$, $R^8$, $R^9$, $R^{10}$, $R^{11}$, $R^{12}$, $R^{13}$, and $R^{14}$ are independently an electron pair or a bond to A, wherein if the $R_7$, $R^8$, $R^9$, $R^{10}$, $R^{11}$, $R^{12}$, $R^{13}$, or $R^{14}$ is a bond to A, the N bears a +1 formal charge; and $R^{15}$, $R^{16}$, $R^{17}$, and $R^{18}$ are independently a hydrogen radical, hydroxyl, straight or branched alkyl, thiol, azide, nitrile, or aryl.

12. The cationic polymer of claim 9, wherein the cationic polymer has a weight-average molecular weight from 25 kilodaltons (kDa) to 500 kDa.

13. The cationic polymer of claim 9, wherein the cationic polymer has a weight-average molecular weight from 25 kilodaltons (kDa) to 100 kDa.

\* \* \* \* \*